(12) United States Patent
Ramlall

(10) Patent No.: US 9,083,596 B1
(45) Date of Patent: Jul. 14, 2015

(54) NON-DATA-AIDED JOINT TIME AND FREQUENCY OFFSET ESTIMATION METHOD FOR OFDM SYSTEMS USING CHANNEL ORDER BASED REGRESSION

(71) Applicant: The United States of America as represented by the Secretary of the Navy, Washington, DC (US)

(72) Inventor: Rohan Y. Ramlall, Brentwood, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 15 days.

(21) Appl. No.: 14/091,048

(22) Filed: Nov. 26, 2013

(51) Int. Cl.
*H04K 1/10* (2006.01)
*H04L 27/26* (2006.01)

(52) U.S. Cl.
CPC ........ *H04L 27/2665* (2013.01); *H04L 27/2659* (2013.01)

(58) Field of Classification Search
USPC .................. 375/260, 340, 347; 370/329, 203
See application file for complete search history.

(56) References Cited

U.S. PATENT DOCUMENTS

| 8,218,665 | B2 | 7/2012 | Chin et al. | |
| 8,320,506 | B2 * | 11/2012 | Jo et al. | 375/340 |
| 2009/0028042 | A1 * | 1/2009 | Chin et al. | 370/203 |
| 2013/0188578 | A1 * | 7/2013 | Touboul et al. | 370/329 |
| 2014/0010334 | A1 * | 1/2014 | Kotzsch, Vincent | 375/347 |

OTHER PUBLICATIONS

J. Diez, D. De Castro, J.M. Palomo, M. Tossaint, "Integrated navigation and communication system based on OFDM," 2010 5th ESA Workshop on Satellite Navigation Technologies and European Workshop on GNSS Signals and Signal Process. NAVITEC, pp. I-5, Dec. 8-10, 2010.

F. Zanier, M. Luise, "Fundamental issues in time-delay estimation of multicarrier signals with applications to next-generation GNSS," 2008 SPSC 10th Int. Workshop on Signal Process for Space Commun., vol., No., pp. I-8, Oct. 6-8, 2008.

J.J. Van De Beek, M. Sandell, P.O. Botjesson, "ML estimation of time and frequency offset in OFDM systems," IEEE Trans. Signal Process,vol. 45, No. 7, pp. 1800-1805, Jul. 1997.

(Continued)

*Primary Examiner* — Eva Puente
(74) *Attorney, Agent, or Firm* — SPAWAR Systems Center Pacific; Kyle Eppele; Ryan J. Friedl

(57) ABSTRACT

A system and method involve receiving a plurality of samples of an orthogonal frequency division multiplex (OFDM) signal containing a complete OFDM symbol. The OFDM symbol includes data samples and a cyclic prefix comprising inter-symbol interference (ISI) samples and ISI-free samples. The ISI samples are used to limit the search region of possible symbol time offset (STO) estimates made using the ISI-free samples. This may involve determining a first cost function using the ISI-free samples and using data samples that correspond to the ISI-free samples, determining a second cost function using the ISI samples and using data samples that correspond to the ISI samples, using regression coefficients to determine a set of STOs yielding the smallest second cost function, and determining a joint estimate of STO and carrier frequency offset (CFO) by finding STO and CFO values within the set that result in minimization of the first cost function.

20 Claims, 12 Drawing Sheets

(56) References Cited

OTHER PUBLICATIONS

D. Landstrom, S. Wilson, J.J. Van De Beek, P. Odling, P.O. Botjesson, "Symbol time offset estimation in coherent OFDM systems," IEEE Trans. Commun., vol. 50, No. 4, pp. 545-549, Apr. 2002.

J.A. Lopez-Salcedo, E. Gutierrez G. Seco-Granados, A.L. Swinehurst, "Unified framework for the synchronization of flexible multicarrier communication signals," IEEE Trans. Signal Process., vol. 61, No. 4, pp. 828-842, Feb. 2013.

W.L. Chin, "ML Estimation of Timing and Frequency Offsets Using Distinctive Correlation Characteristics of OFDM Signals Over Dispersive Fading Channels," IEEE Trans. Veh. Technology, vol. 60, No. 2, pp. 444-456, Feb. 2011.

D. Lee; K. Cheun, "Coarse symbol synchronization algorithms for OFDM systems in multipath channels," IEEE Commun. Lett., vol. 6, No. 10, pp. 446-448, Oct. 2002.

R. Mo, Y. Chew, T. Tjhung, C. Ko, "A joint blind timing and frequency offset estimator for OFDM systems over frequency selective fading channels," IEEE Trans. Wireless Commun., vol. 5, No. 9, pp. 2594-2604, Sep. 2006.

R. Martin, J. Velotta, J. Raquet, "Bandwidth Efficient Cooperative TDOA Computation for Multicarrier Signals of Opportunity," IEEE Trans. Signal Process., vol. 57, No. 6, pp. 2311-2322, Jun. 2009.

M. Speth, F. Classen, H. Meyr, "Frame synchronization of OFDM systems in frequency selective fading channels," 1997 IEEE 47th Veh. Technology Conf., vol. 3, No., pp. 1807-1811, May 4-7, 1997.

J. McNeff, "Changing the Game Changer—The Way Ahead for Military PNT," Inside GNSS, vol. 5, No. 8, pp. 44-51, Dec. 2010.

* cited by examiner ived is critical to the performance of RF navigation systems since this estimate provides information on the distance between the transmitter and receiver.
NON-DATA-AIDED JOINT TIME AND FREQUENCY OFFSET ESTIMATION METHOD FOR OFDM SYSTEMS USING CHANNEL ORDER BASED REGRESSION

FEDERALLY-SPONSORED RESEARCH AND DEVELOPMENT

The Non-Data-Aided Joint Time and Frequency Offset Estimate Method for OFDM Systems Using Channel Order Based Regression is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 102316.

BACKGROUND

Multicarrier signals are predominant in many terrestrial wireless communication systems. There is a growing interest in utilizing multicarrier signals for navigation purposes because multicarrier schemes are effective in combating multipath effects, which are one of the major sources of error for radio frequency (RF) navigation systems due to the bias introduced in the time delay estimate. The time delay estimate (the time difference between when the signal is transmitted and received) is critical to the performance of RF navigation systems since this estimate provides information on the distance between the transmitter and receiver.

Multicarrier systems are sensitive to frequency offsets, which also need to be estimated in order to correctly demodulate the received data. Orthogonal frequency division multiplexing (OFDM) is a multicarrier modulation method that has been adopted in standards such as IEEE 802.11a/g, DVB-T/T2, and LTE, so there are numerous signals of opportunity available to use for position estimation, even though these signals were not originally intended for positioning, navigation, and timing applications.

Non-data-aided time and frequency offset estimators have the advantage of not requiring any known training data to estimate some desired parameter, thus preserving high bandwidth efficiency. Non-data-aided estimators can readily adapt to different OFDM standards since they are not reliant on training data which varies across standards. Some non-data-aided approaches jointly estimate the symbol time offset (STO) and carrier frequency offset (CFO) in OFDM systems. However, such methods typically require more than one OFDM symbol to achieve sufficient estimation performance for all signal-to-noise ratios (SNR) due to a flooring effect exhibited at higher SNR. Using multiple symbols is not well-suited for navigation-related applications in which fast acquisition time is critical. Further, methods that use only one complete OFDM symbol exhibit a flooring effect at higher SNR.

A joint time and frequency offset estimator for OFDM systems is needed that utilizes one OFDM symbol and achieves sufficient estimation performance for all SNRs.

BRIEF DESCRIPTION OF THE DRAWINGS

FIG. 5 shows a graph illustrating STO MSE estimation performance for 3GPP Rax channel IEEE 802.11a.

FIG. 6 shows a graph illustrating CFO MSE estimation performance for 3GPP Rax channel IEEE 802.11a.

FIG. 7B shows a graph illustrating lock-in probability for 3GPP Rax channel IEEE 802.11a.

FIG. 8 shows a graph illustrating sensitivity of STO estimate to P for 3GPP Rax channel IEEE 802.11a.

FIG. 9 shows a graph illustrating sensitivity of CFO estimate to P for 3GPP Rax channel IEEE 802.11a.

FIG. 10 shows a graph illustrating sensitivity of lock-in probability to P for 3GPP Rax channel IEEE 802.11a.

DETAILED DESCRIPTION OF SOME EMBODIMENTS

The subject matter disclosed herein involves non-data-aided joint STO and CFO estimator for OFDM systems using only one complete OFDM symbol and knowledge of the channel order. The estimator utilizes two distinct but complementary estimators which are combined, based on the channel order, to produce the final estimate. The estimator uses regression based on the channel order to determine how much the ISI region of the cyclic prefix could help improve the estimation based on the ISI free region. The proposed estimator performs better than comparable methods for low SNR in Rayleigh fading multipath channels in terms of MSE and lock-in probability, especially for higher order channels.

In general, the low-pass frequency-selective channel model is given by $$h(t) = \sum_{l=0}^{L-1} h_l \delta(t - lT_s) \quad \text{(Eq. 1)}$$

where L is the order of the channel, $h_l$ is the complex amplitude of the l-th multipath arrival, and $T_s$ is the sampling period. The channel is assumed to stay unchanged over the duration of a couple of OFDM symbols. The transmitted OFDM symbol s(n) n=0, ..., N+$N_{cp}$−1 is produced by taking the N point inverse discrete Fourier transform (IDFT) of the modulated data symbols {$x_d$, d=0, ..., N−1} and pre-pending the last $N_{cp}$ samples. It is assumed that the cyclic prefix is greater than or equal to the order of the channel (i.e., $N_{cp} \geq L$). The received OFDM samples are given by $$r(k) = e^{j2\pi\epsilon k/N} \sum_{l=0}^{L-1} h_l s_{k-l} + n_k \quad k = 0, \ldots, \theta, \ldots, 2N + N_{cp} - 1 \quad \text{(Eq. 2)}$$

where $\theta$ is the integer STO, $\epsilon \in (-0.5, 0.5]$ is the CFO normalized to $1/NT_s$, and n is additive white Gaussian noise (AWGN) with variance $\sigma_n^2$. Since $\theta$ is unknown, $2N+N_{cp}$ samples, as opposed to $N+N_{cp}$ samples, need to be collected at the receiver in order to estimate $\theta$. However, only one complete OFDM symbol is actually contained in the received samples.

Figure 1A:
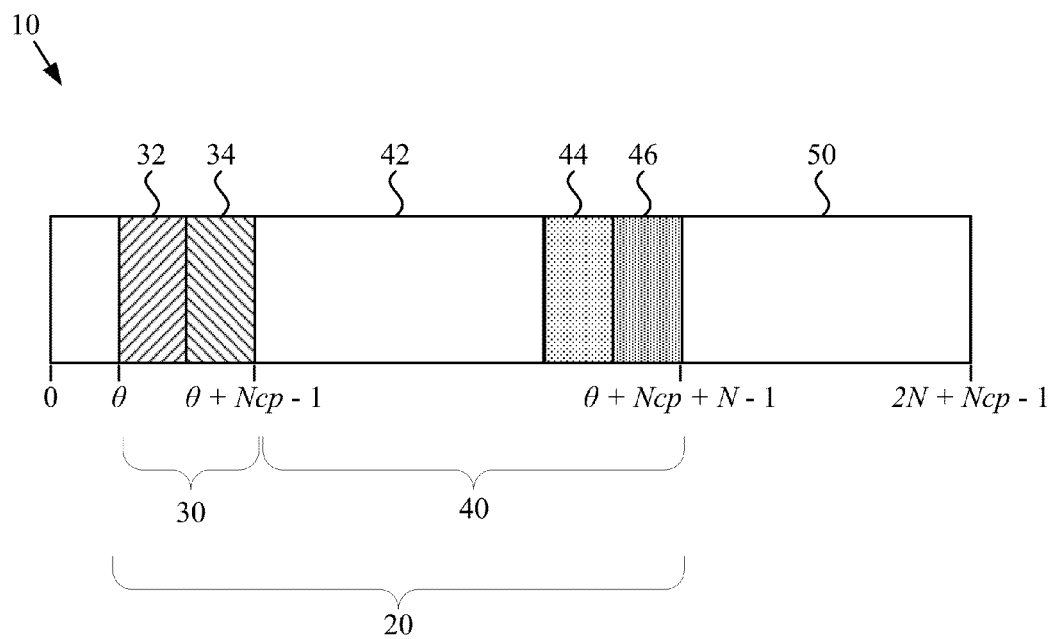
FIG. 1A shows a diagram of an OFDM signal containing a complete OFDM data symbol.
Figure 1B:
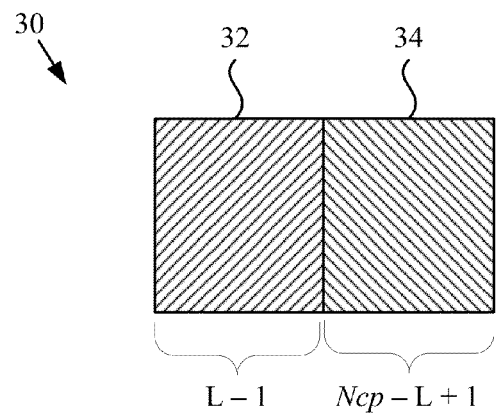
FIG. 1B shows a diagram of the cyclic prefix portion of the OFDM data symbol shown in FIG. 1.

FIG. 1A shows a received OFDM signal 10 containing a complete OFDM symbol 20. Symbol 20 includes a cyclic prefix 30 and a data portion 40. Cyclic prefix includes an inter-symbol interference (ISI) region 32 and an ISI-free region 34. Data portion 40 includes a first data portion 42, a second data portion 44, and a third data portion 46. Data portion 40 contains samples representing the transmitted OFDM symbol. First data portion 42 represents the samples that have not been affected by interference. Second data portion 44 is a data region that corresponds to ISI region 32. Third data portion 46 is a data region that corresponds to ISI-free region 34. As shown in FIG. 1B, ISI region 32 has a length of $L-1$ and ISI-free region 34 has a length of $N_{cp}-L+1$.

In the samples given by (Eq. 2), there are $N_{cp}-L+1$ inter-symbol interference (ISI) free samples and $L-1$ ISI samples in the cyclic prefix of the received OFDM symbol. Based on the observation that both of these regions can help provide information about $\theta$, an ad-hoc estimator is presented assuming the channel order L is known. For the ISI-free region, multiplying each cyclic prefix sample by $e^{j2\pi\epsilon}$ and then taking the difference of each cyclic prefix sample with its redundant data sample results in $N_{cp}-L+1$ observations given by $$e^{j2\pi\epsilon} r(k+\theta) - r(N+k+\theta) = \quad \text{(Eq. 3)}$$
$$e^{j2\pi\epsilon(N+k+\theta)/N} \sum_{l=0}^{L-1} h_l(s_{k+\theta-l} - s_{N+k+\theta-l}) + e^{j2\pi\epsilon} n_{k+\theta} - n_{N+k+\theta}$$

for $k=L-1, \ldots, N_{cp}-1$. Note that the scalar multiplication by $e^{j2\pi\epsilon}$ does not change the characteristics of the noise. If the correct STO was used in (Eq. 3), (Eq. 3) would just be observations of noise differences, and the 2-norm of the $(N_{cp}-L+1) \times 1$ vector of samples would be minimized. This yields the following first cost function:

$$\min_{\hat{\theta}} J_1(\hat{\theta}) = \min_{\hat{\theta}} \sum_{m=L-1}^{N_{cp}-1} \left(e^{j2\pi\epsilon} r(m+\hat{\theta}) - r(N+m+\hat{\theta})\right)^2 \quad \text{(Eq. 4)}$$

Figure 2:
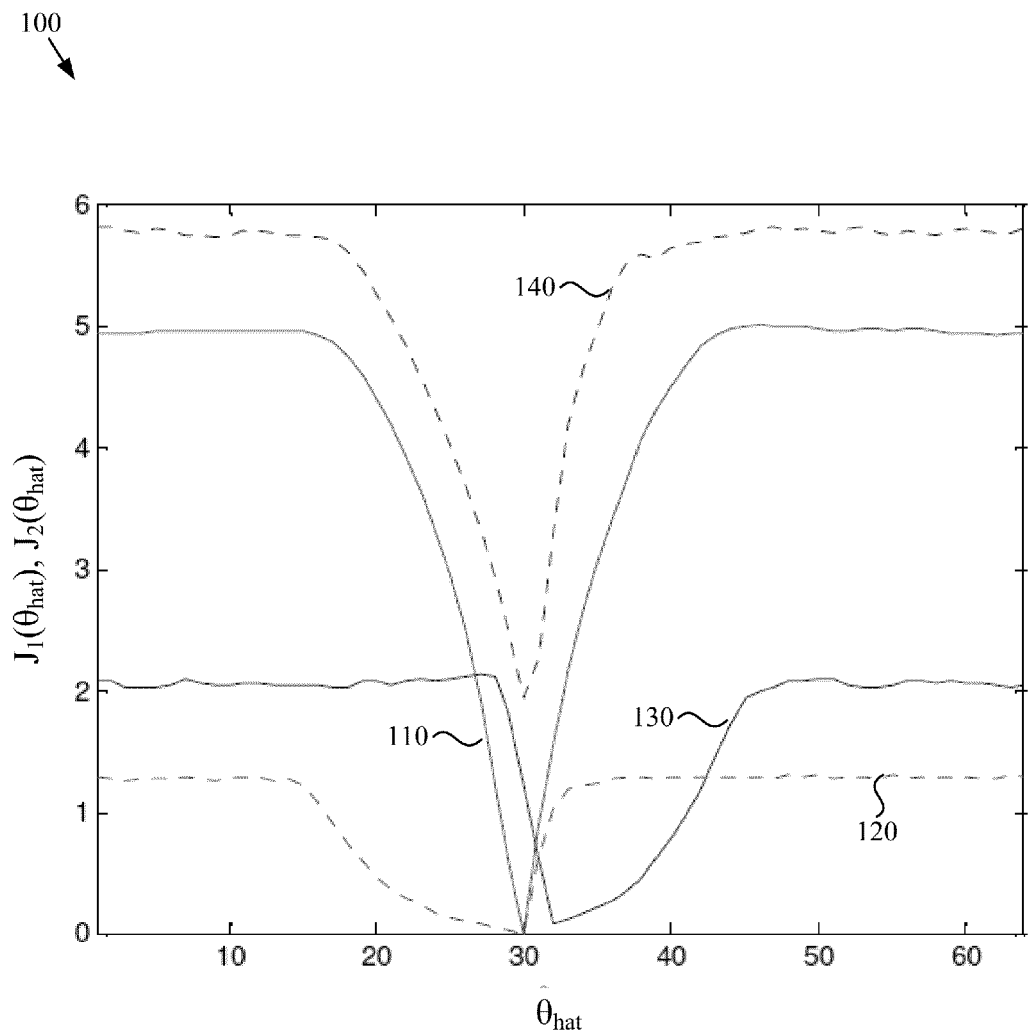
FIG. 2 shows a graph illustrating the average of 1000 simulations of the cost functions versus symbol time offset estimates.

Equation (4) is minimized when $\hat{\theta}=\theta$ as shown in FIG. 2. FIG. 2 shows a graph 100 illustrating cost functions versus symbol time offset estimates. Curves 110 and 120 show the mean of 1000 realizations of the cost function (Eq. 4) versus STO estimates for two different channels without AWGN and $\theta=30$. Curve 110 is for $N_{cp}-L+1=16-3+1=14$ and curve 120 is for $N_{cp}-L+1=16-15+1=2$.

For the ISI region, multiplying each cyclic prefix sample by $e^{j2\pi\epsilon}$ and then taking the difference of each cyclic prefix sample with its redundant data sample results in $L-1$ observations, which produces the second cost function $$\min_{\hat{\theta}} J_2(\hat{\theta}) = \min_{\hat{\theta}} \sum_{m=0}^{L-2} \left(e^{j2\pi\epsilon} r(m+\hat{\theta}) - r(N+m+\hat{\theta})\right)^2 \quad \text{(Eq. 5)}$$

Even though there is ISI when the correct STO is used in (Eq. 5), if a sufficient number of samples is used in the cost function, then (5) is minimized when $\hat{\theta}=\theta$ as shown in FIG. 2. Similar to curves 110 and 120, curves 130 and 140 show the mean of 1000 realizations of the cost function (Eq. 5) versus STO estimates for $\theta=30$. Curve 130 is for $N_{cp}-L+1=16-3+1=14$ and curve 140 is for $N_{cp}-L+1=16-15+1=2$.

The curves in FIG. 2 complement each other due to the number of samples available for each cost function: for small L, curve 110 has a definitive minimum whereas the minimum of curve 130 is degraded; for large L, curve 140 has a smaller definitive minimum region whereas the minimum of curve 120 is degraded. This observation is the basis for the ad-hoc estimator discussed herein. First, however, an estimator for the CFO is needed. The CFO estimator given by (Eq. 6) achieves the Cramér-Rao bound for AWGN channels and is sufficient for the system and method discussed herein.

$$\hat{\epsilon} = -\frac{1}{2\pi L} \sum_{m=L-1}^{N_{cp}-1} \angle\left(r(m+\hat{\theta}) r^*(N+m+\hat{\theta})\right) \quad \text{(Eq. 6)}$$

The proposed joint STO and CFO estimator (procedure for finding $(\theta, \epsilon)$) using one complete OFDM symbol is presented below:

Input: $(2N + N_{cp}) \times 1$ vector of received samples $\vec{r}$ and regression coefficients $\vec{p}$.
Output: $(\theta^*, \hat{\epsilon}^*)$.
1. For $\hat{\theta} = 0$ to $N - 1$
   a. Let $\vec{r}_{1a} = [r(\hat{\theta} + L - 1) \ldots r(\hat{\theta} + N_{cp} - 1)]$ and
      $\vec{r}_{1b} = [r(\hat{\theta} + N + L - 1) \ldots r(\hat{\theta} + N + N_{cp} - 1)]$
   b. Let $\vec{r}_{2a} = [r(\hat{\theta}) \ldots r(\hat{\theta} + L - 2)]$ and
      $\vec{r}_{2b} = [r(\hat{\theta} + N) \ldots r(\hat{\theta} + N + L - 2)]$
   c. $\hat{\epsilon}_{\hat{\theta}} = -\frac{1}{2\pi} \angle(\vec{r}_{1a} \vec{r}_{1b}^H)$
   d. Calculate $J_1(\hat{\theta}, \hat{\epsilon}_{\hat{\theta}}) = \|e^{j2\pi\hat{\epsilon}} \vec{r}_{1a} - \vec{r}_{1b}\|_2^2$ and
      $J_2(\hat{\theta}, \hat{\epsilon}_{\hat{\theta}}) = \|e^{j2\pi\hat{\epsilon}} \vec{r}_{2a} - \vec{r}_{2b}\|_2^2$
2. If $L = 1$, $(\hat{\theta}^*, \hat{\epsilon}^*) = \min_{(\hat{\theta}, \hat{\epsilon}_{\hat{\theta}})} J_1(\hat{\theta}, \hat{\epsilon}_{\hat{\theta}})$
   else if $L = N_{cp}$, $(\hat{\theta}^*, \hat{\epsilon}^*) = \min_{(\hat{\theta}, \hat{\epsilon}_{\hat{\theta}})} J_2(\hat{\theta}, \hat{\epsilon}_{\hat{\theta}})$
   else
   a. Let I be the set of round(PN) STOs yielding the smallest $J_2(\hat{\theta}, \hat{\epsilon}_{\hat{\theta}})$, where $0 < P \leq 1$ is determined by using $\vec{p}$
   b. $(\hat{\theta}^*, \hat{\epsilon}^*) = \min_{(\hat{\theta}, \hat{\epsilon}_{\hat{\theta}}) \in I} J_1(\hat{\theta}, \hat{\epsilon}_{\hat{\theta}})$ The method uses (Eq. 5) to narrow down the search region for the possible STO estimates before using (Eq. 4). The search region is narrowed down by using the set of round (PN) STO estimates yielding the smallest second cost function, where $0<P\leq1$. This set of round (PN) STO estimates is denoted by I, where the cardinality of I is equal to round (PN). Based on extensive simulations, there exists an inverse relationship between L and P. For a given OFDM system (i.e., N and $N_{cp}$), regression can be used to determine P as a function of L by running simulations. For example (using MATLAB notation), run simulations with channel order $L=2:N_{cp}-1$, and for each simulation, let $P=0.1:0.1:0.9$. Determine which P gives the best estimation performance in terms of mean squared error(MSE) for each simulation, thus yielding $N_{cp}-2$ pairs of (L, P) measurements to perform regression upon.

The effectiveness of the P vs. L relationship is dependent upon which channel model is used in the simulations. The author found that the following channel model, based on the Cost 207 average power delay profile for typical urban areas, provided P vs. L relationships that were effective in realistic channel models (see Section IV).

$$P_h(l)=e^{-l/2} 0\leq l\leq L-1 \quad \text{(Eq. 7)}$$

This model is simplistic, but models the fact that multipath components with longer delays tend to have less power. The regression coefficients can be calculated offline and are known to the receiver. However, the computational complexity of the proposed estimator is still higher in terms of arithmetic operations and searching/sorting when compared to other algorithms. For each STO estimate, the proposed estimator requires $3N_{cp}-L$ additions, $3N_{cp}-L+1$ multiplications, and one angle operation. In the worst case, a search for the minimum of a partitioned subset of N estimates is required.

The performance of the proposed estimator is compared to other estimators through Monte Carlo simulations with $10^4$ realizations. Other estimators are comparable to the proposed estimator since they only use knowledge of the channel order. The OFDM signal specifications used are similar to those of the IEEE 802.11a and smallest bandwidth LTE signal standards (see Table 1). Generic OFDM signals were generated similar to those of the IEEE 802.11a and smallest bandwidth LTE signal standards in terms of bandwidth, N, and $N_{cp}$, (see Table 1). In all of the simulations, $\theta=5$, $\epsilon=0.1$, BPSK modulation and Rayleigh fading channels were used where the channel coefficients were normalized to unit power, and only $2N+N_{cp}$ samples were collected at the receiver. Two scenarios were simulated using MATLAB: 1) 3GPP Typical Urban channel (Tux) and 2) 3GPP Rural Area channel (Rax).

Figure 3:
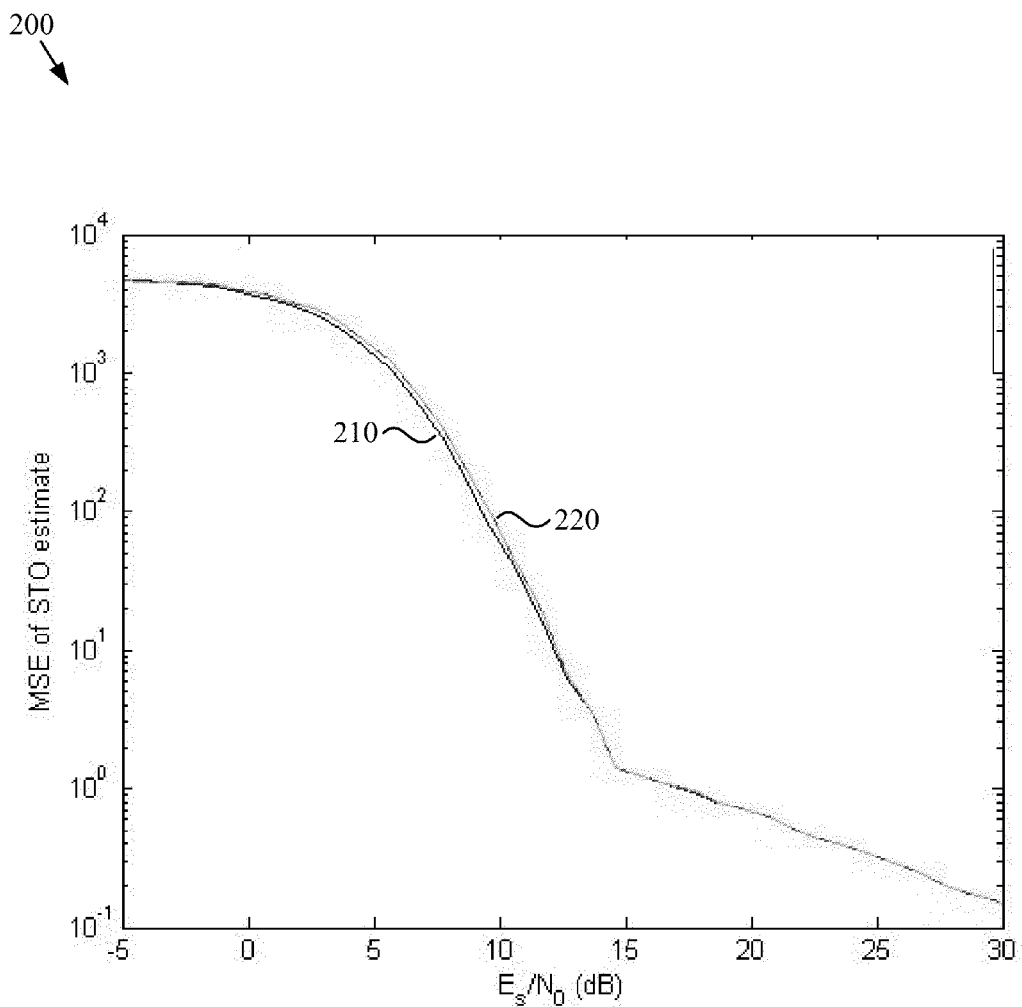
FIG. 3 shows a graph illustrating STO MSE estimation performance for 3GPP Tux channel LTE.
Figure 4:
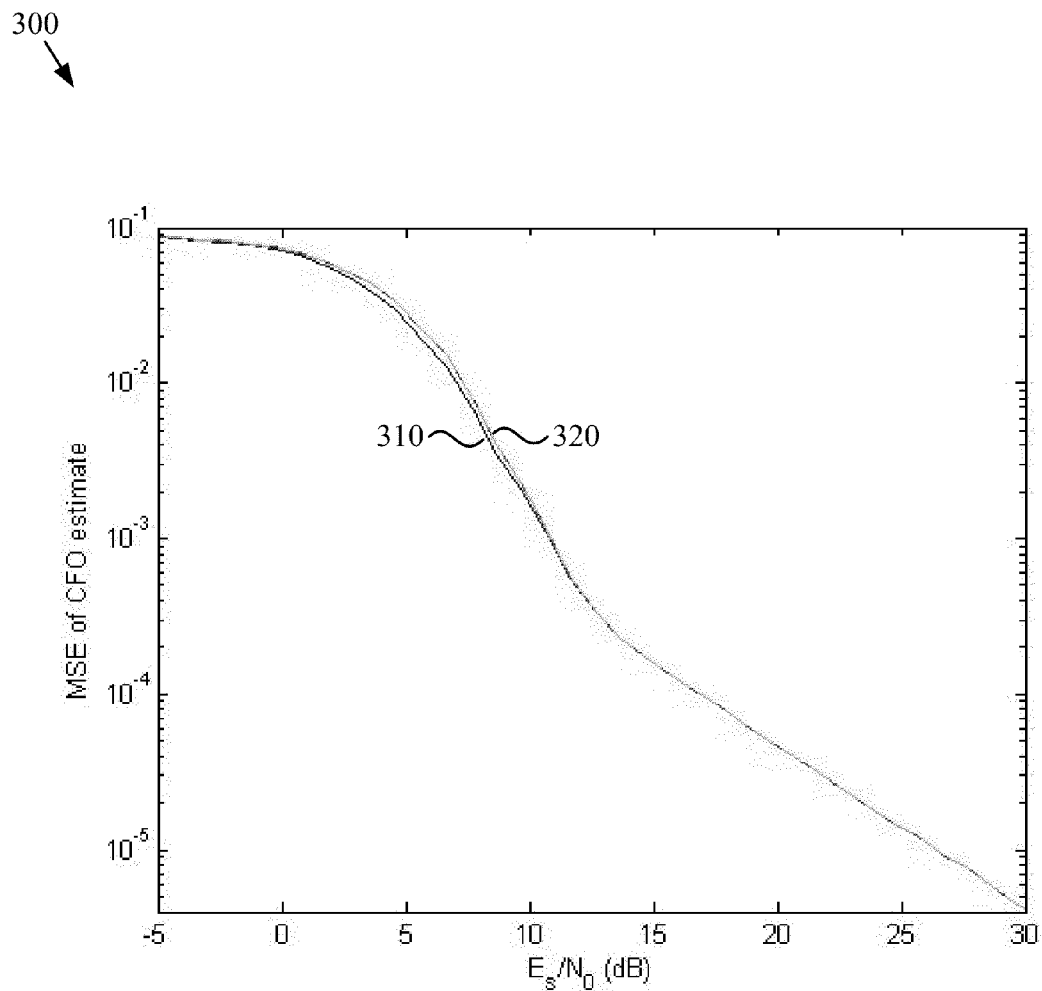
FIG. 4 shows a graph illustrating CFO MSE estimation performance for 3GPP Tux channel LTE.

FIG. 3 shows a graph 200 illustrating STO MSE estimation performance for 3GPP Tux channel LTE, which is effectively a fourth order channel. Curve 210 represents the MSE of the STO estimate for the estimator discussed herein, while curve 220 represents the MSE of the STO estimate for two separate estimators known in the art—one discussed in a publication by Speth, M. et al., "Frame Synchronization of OFDM Systems in Frequency Selective Fading Channels", 1997 IEEE 47th Vehicle Technology Conf., vol. 3, pp. 1807-1811 ("Speth Estimator") and the other discussed in a publication by Mo, R. et al., "A Joint Blind Timing and Frequency Offset Estimator for OFDM Systems Over Frequency Selective Fading Channels," IEEE Trans. Wireless Communications, vol. 5, no. 9, pp. 2594-2604, September 2006 ("Mo Estimator"). FIG. 4 shows a graph 300 illustrating CFO MSE estimation performance for 3GPP Tux channel LTE. Curve 310 represents the MSE of the STO estimate for the estimator discussed herein, while curve 320 represents the MSE of the STO estimate for the Speth Estimator and the Mo Estimator. As can be seen in FIGS. 3-4, the estimator disclosed herein performs slightly better than the Speth Estimator and the Mo Estimator for SNR<~13 dB and equivalently for higher SNR.

Figure 5:
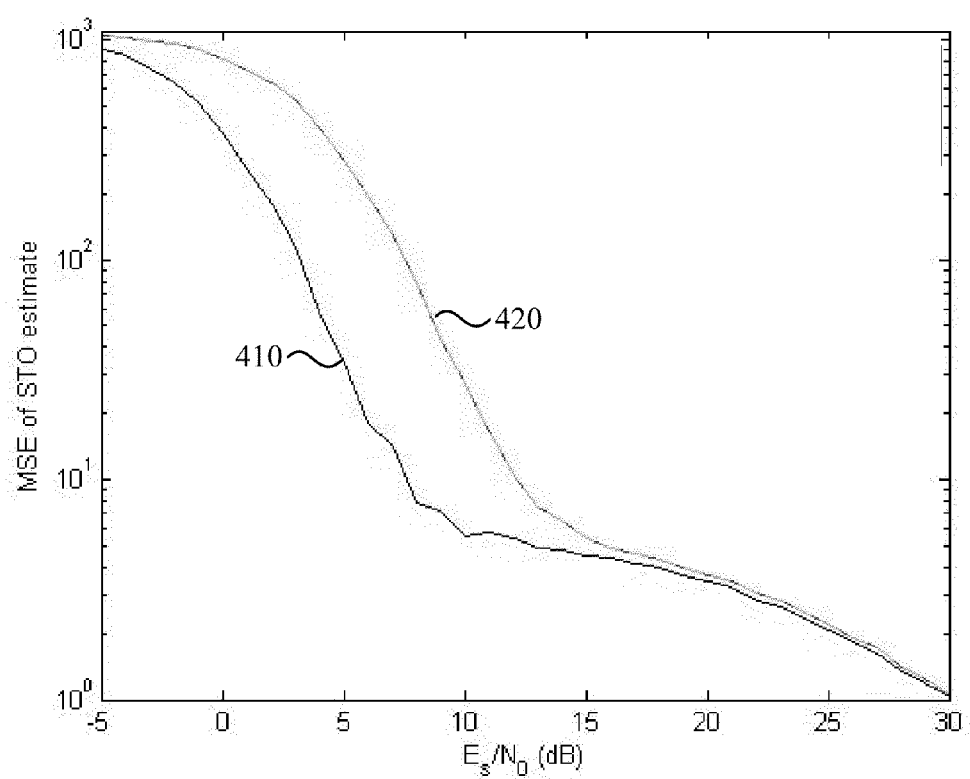
Figure 6:
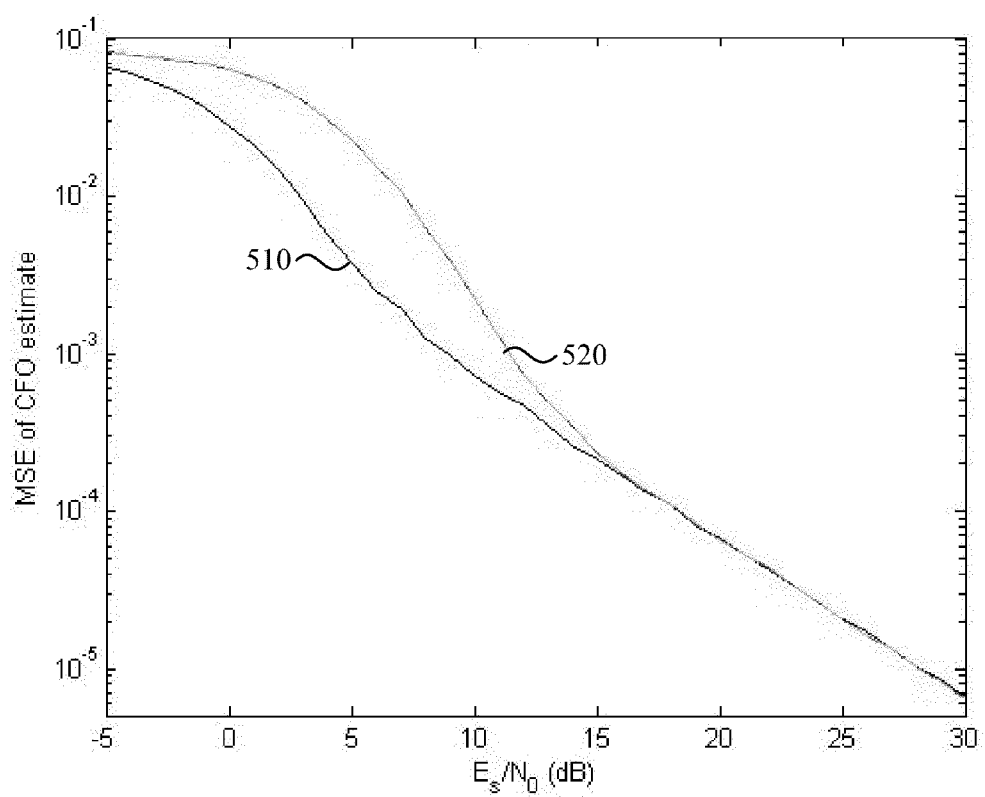

FIG. 5 shows a graph 400 illustrating STO MSE estimation performance for 3GPP Rax channel IEEE 802.11a, which is effectively a twelfth order channel. Curve 410 represents the MSE of the STO estimate for the estimator discussed herein, while curve 420 represents the MSE of the STO estimate for the Speth Estimator and the Mo Estimator. FIG. 6 shows a graph 500 illustrating CFO MSE estimation performance for 3GPP Rax channel IEEE 802.11a. Curve 510 represents the MSE of the CFO estimate for the estimator discussed herein, while curve 520 represents the MSE of the CFO estimate for the Speth Estimator and the Mo Estimator.

As can be seen in FIGS. 5 and 6, the estimator disclosed herein performs significantly better than the Speth Estimator and the Mo Estimator for SNR<~15 dB. For SNR=6 dB, the difference in MSE for STO estimation is an order of magnitude and the difference in MSE for CFO estimation is almost an order of magnitude. This demonstrates that as the channel order increases, the estimator disclosed herein performs better than the other estimators for low SNR, since it utilizes the ISI region of the cyclic prefix as opposed to the other estimators, which only utilize the ISI-free region.

TABLE 1

|  | IEEE 802.11a | LTE[a] |
| --- | --- | --- |
| Channel Bandwidth | 20 MHz | 1.4 MHz |
| FFT Size N | 64 | 128 |
| Cyclic Prefix Length $N_{cp}$ (in FFT samples) | 16 | 10 |

Figure 7A:
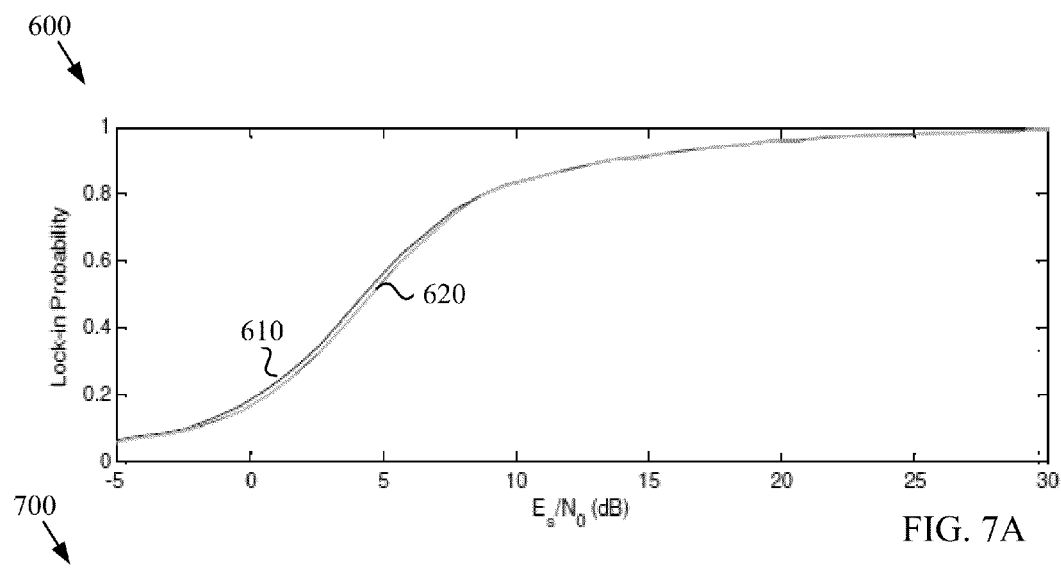
FIG. 7A shows a graph illustrating lock-in probability for 3GPP Tux channel LTE.
Figure 7B:
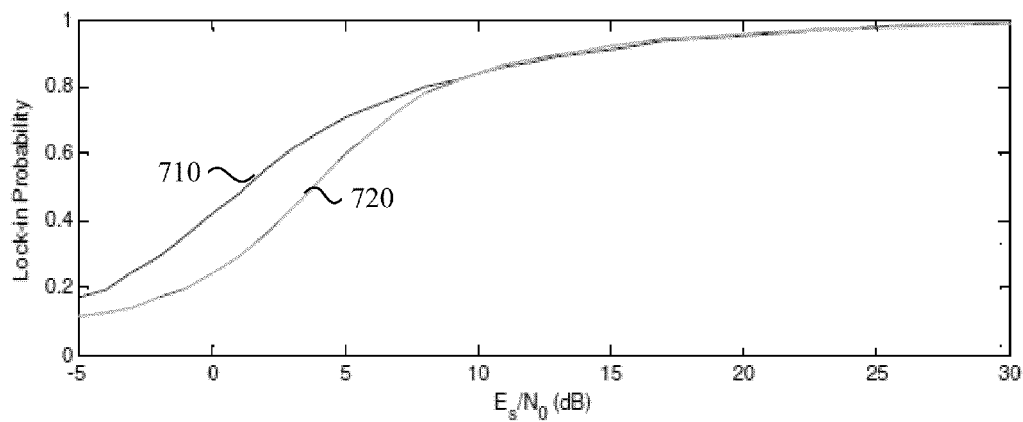

FIGS. 7A and 7B show the lock-in probability for the previous two scenarios. The lock-in probability is the probability that the estimated STO lies in the ISI free region (i.e., $P(L-1-N_{cp}\leq\hat{\theta}^*-\theta\leq0)$), and thus the orthogonality of the subcarriers is preserved. FIG. 7A shows a graph 600 illustrating lock-in probability for 3GPP Tux channel LTE. Curve 610 represents the lock-in probability for the estimator discussed herein, while curve 620 represents the lock-in probability for the Speth Estimator and the Mo Estimator. FIG. 7B shows a graph 700 illustrating lock-in probability for 3GPP Rax channel IEEE 802.11a. Curve 710 represents the lock-in probability for the estimator discussed herein, while curve 720 represents the lock-in probability for the Speth Estimator and the Mo Estimator.

The estimator disclosed herein has the highest lock-in probability for low SNR (i.e., SNR<~9 dB). Similar to the MSE performance, the difference between the estimator disclosed herein and lock-in probabilities of the Speth Estimator and the Mo Estimator increases as the channel order increases for low SNR. Note that the other estimators and the proposed estimator have equal probabilities for higher SNR (i.e., SNR>~9 dB) for the 3GPP Tux channel for LTE, but the other estimators slightly outperform the estimator disclosed herein in the 3GPP Rax channel for IEEE 802.11a. This can be explained by the sensitivity of the proposed estimator to P.

Figure 8:
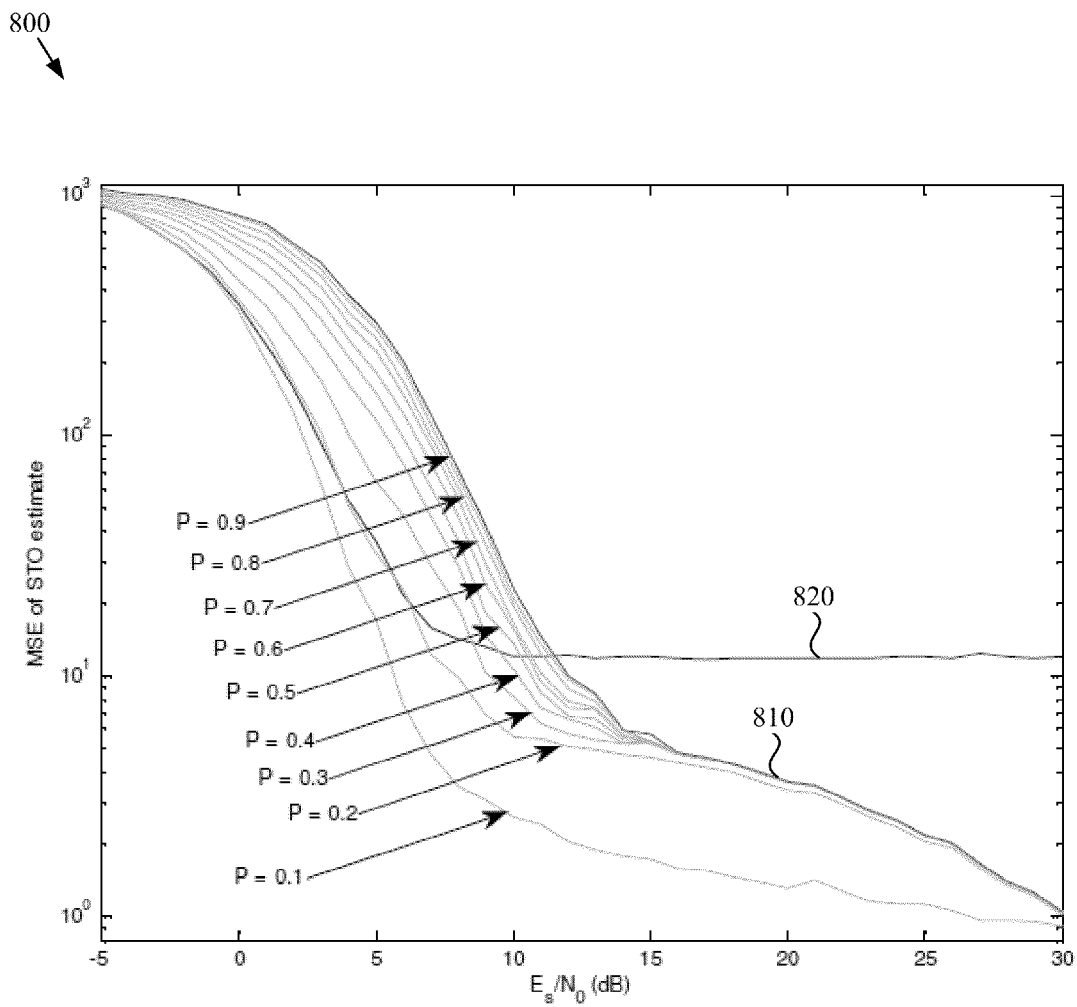
Figure 9:
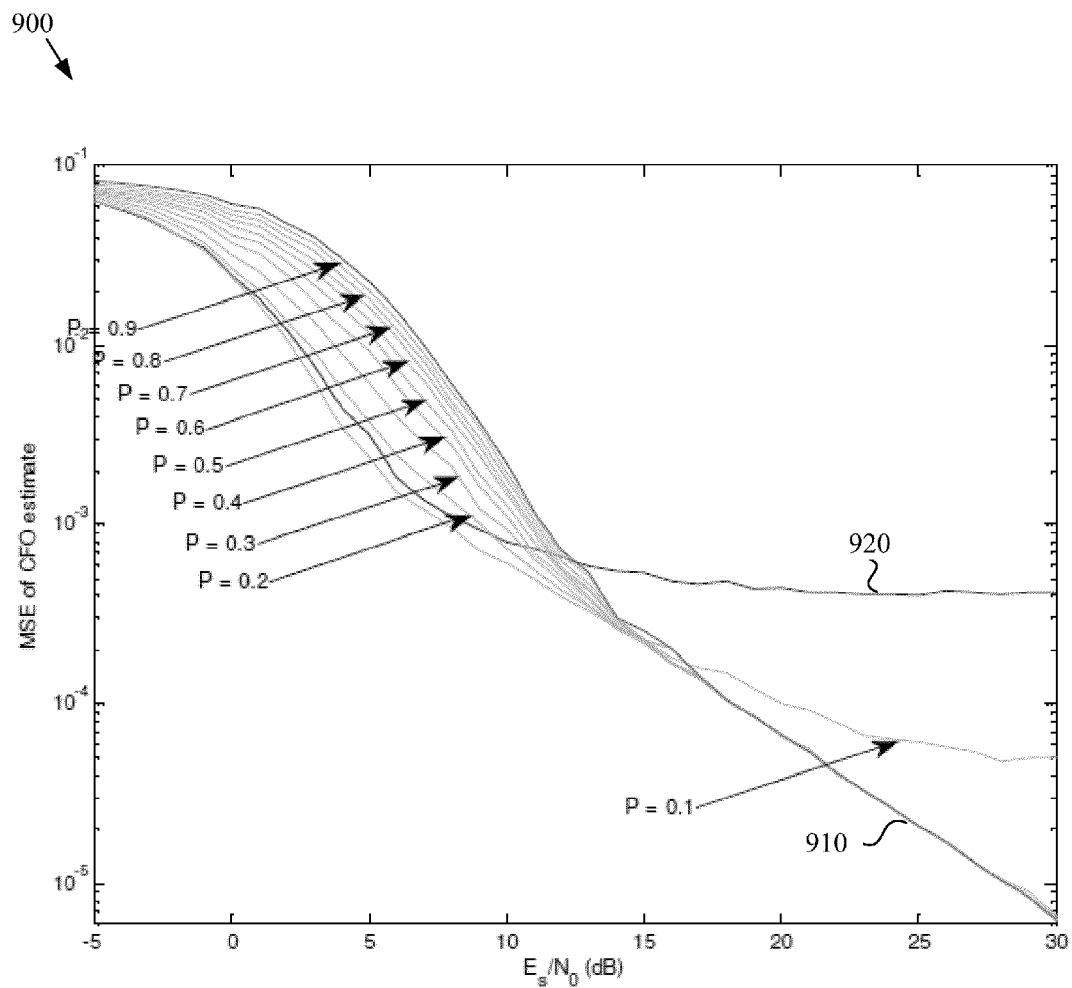
Figure 10:
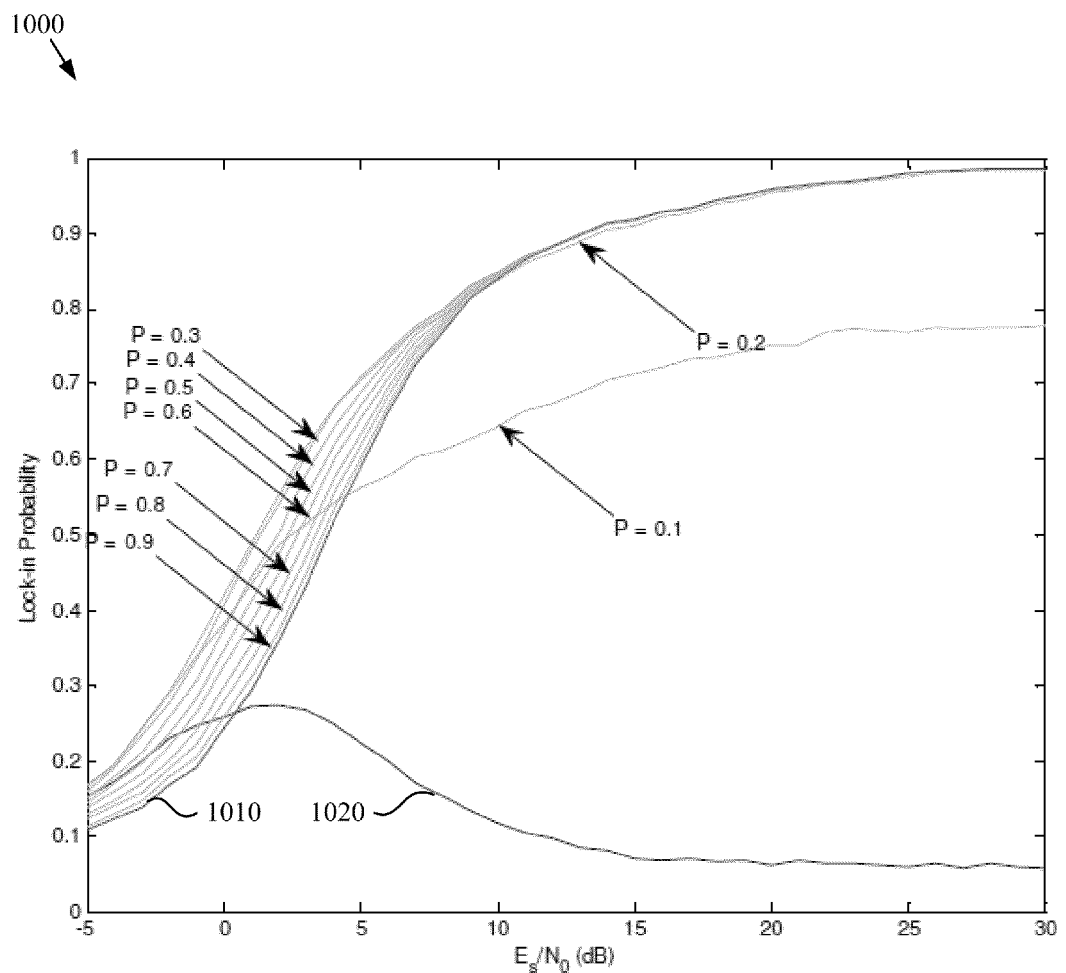

Referring to FIGS. 8-10, FIG. 8 shows a graph 800 illustrating sensitivity of STO estimate to P for 3GPP Rax channel IEEE 802.11a, FIG. 9 shows a graph 900 illustrating sensitivity of CFO estimate to P for 3GPP Rax channel IEEE 802.11a, and FIG. 10 shows a graph 1000 illustrating sensitivity of lock-in probability to P for 3GPP Rax channel IEEE 802.11a. Curves 810, 910, and 1010 represent when P=1, whereas curves 820, 920, and 1020 represent when P=1/N. Curves 810, 910, 1010, 820, 920, and 1020 shown in FIGS. 8-10 represent the limiting cases for P. Based upon FIGS. 8-10, it can be seen that the estimator disclosed herein is less sensitive to higher values of P and more sensitive to lower values of P. This makes sense because small values of P can result in search regions I not containing the true STO, whereas larger values of P will more likely result in I containing the true STO.

Figure 11:
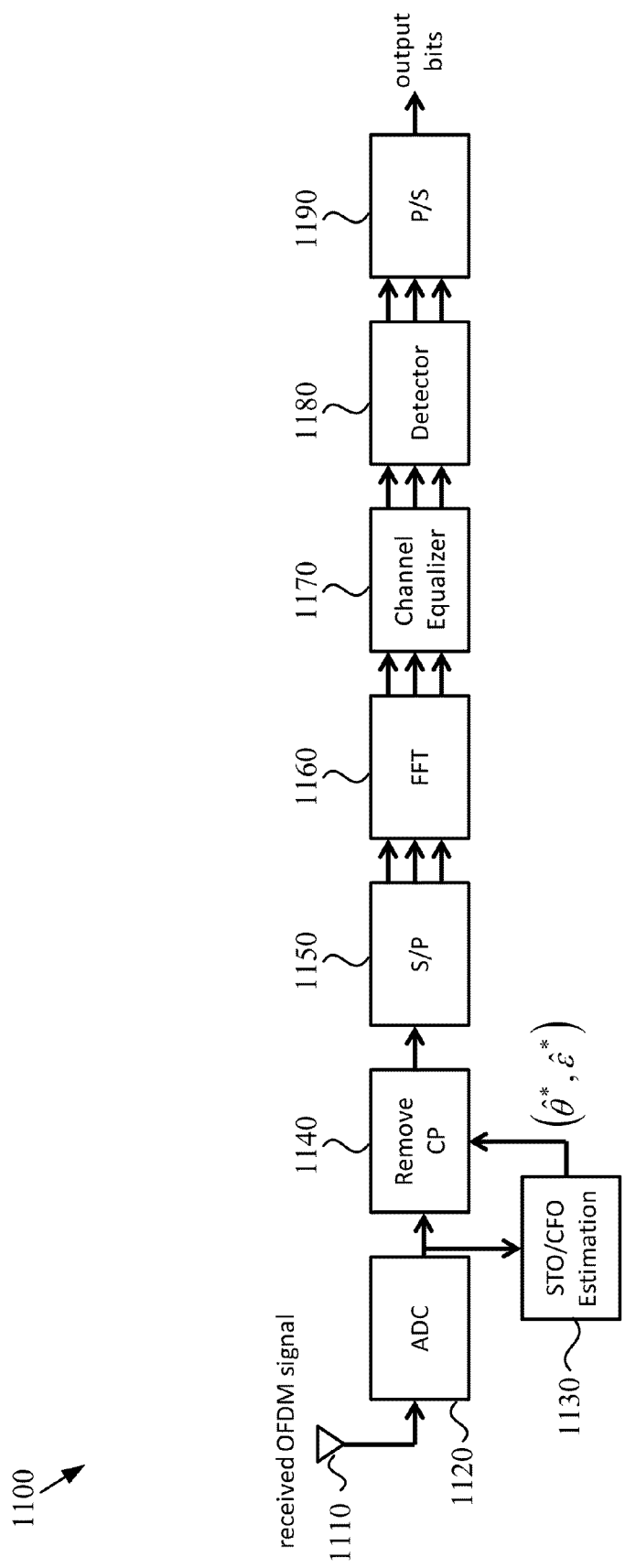
FIG. 11 shows a diagram of an embodiment of an OFDM receiver system that may be used to implement the Non-Data-Aided Joint Time and Frequency Offset Estimate Method for OFDM Systems Using Channel Order Based Regression.

FIG. 11 shows a diagram of an embodiment of an OFDM receiver system 1100 that may be used to implement the Non-Data-Aided Joint Time and Frequency Offset Estimate Method for OFDM Systems Using Channel Order Based Regression. System 1100 may include antenna 1110 that receives an RF OFDM signal such as signal 10 shown in FIG. 1. The received signal may then be converted to digital form using analog-to-digital converter (ADC) 1120. The output of ADC 1120 is sent to the Non-Data-Aided Joint Time and Frequency Offset Estimate Method for OFDM Systems Using Channel Order Based Regression block 1130, the output of which is a STO and CFO estimate, and based upon this estimate, the cyclic prefix of the OFDM symbol is removed at block 1140.

After removal of the cyclic prefix, the serial stream of OFDM symbols are reshaped into N parallel streams 1150, upon which a Fast Fourier Transform (FFT) is performed 1160. After the FFT 1160, a channel equalizer 1170 removes the channel's effect on the OFDM symbol in the frequency domain. The output of channel equalizer 1170 is demodulated 1180, where the OFDM symbols are converted into binary data, and the N parallel streams of binary data are reshaped into one serial stream 1190. The processing performed in blocks 130-190 may be performed by a processor that is connected to ADC 1120.

Figure 12:
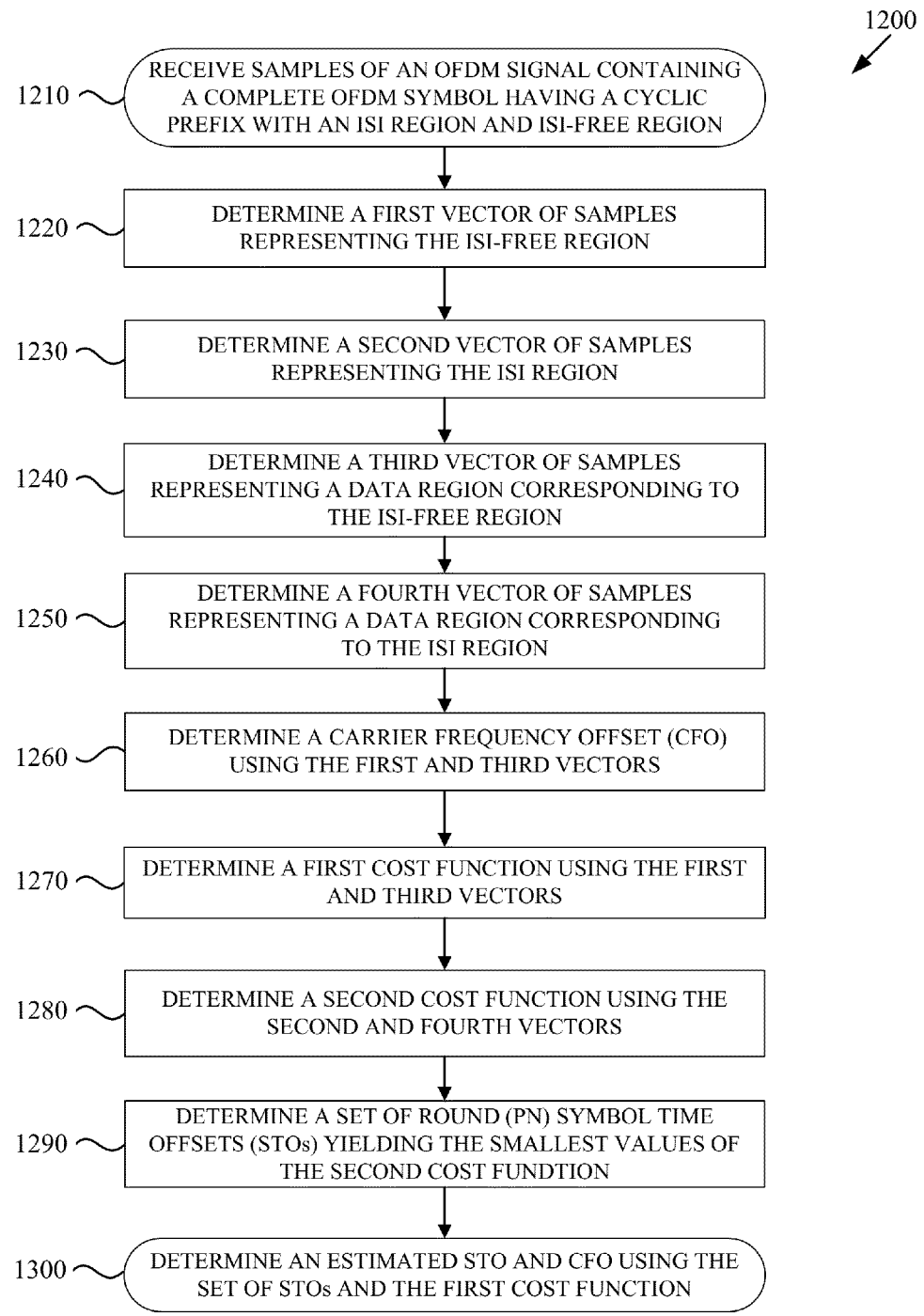
FIG. 12 shows a flowchart of an embodiment of a method in accordance with the Non-Data-Aided Joint Time and Frequency Offset Estimate Method for OFDM Systems Using Channel Order Based Regression.

FIG. 12 shows a flowchart of an embodiment of a method 1200 in accordance with the Non-Data-Aided Joint Time and Frequency Offset Estimate Method for OFDM Systems Using Channel Order Based Regression. As an example, method 1200 may be performed by system 1100 as shown in FIG. 11, using signal 10 as shown in FIG. 1, and will be discussed with reference thereto. Further, while FIG. 12 shows one embodiment of method 1200 to include steps 1210-1300, other embodiments of method 1200 may contain fewer or more steps. Further, while in some embodiments the steps of method 1200 may be performed as shown in FIG. 12, in other embodiments the steps may be performed in a different order, or certain steps may occur simultaneously with one or more other steps.

Method 1200 may begin with step 1210, which involves receiving a plurality of samples of at least one transmitted OFDM signal, such as signal 10 shown in FIG. 1. The samples contain at least one complete OFDM symbol 20 and have a minimum length $2N+N_{cp}$, where N is the number of sub-carriers of the OFDM signal and $N_{cp}$ is the length of a cyclic prefix 30 of the OFDM symbol.

Step 1220 involves determining a first vector of samples representing an ISI-free region 34 of the cyclic prefix 30. As an example, the first vector is determined according to the equation $\vec{r}_{1a}=[r(\hat{\theta}+L-1) \ldots r(\hat{\theta}+N_{cp}-1)]$.

Step 1230 involves determining a second vector of samples representing an ISI region 32 of the cyclic prefix 30. As an example, the second vector is determined according to the equation $\vec{r}_{2a}=[r(\hat{\theta}) \ldots r(\hat{\theta}+L-2)]$.

Step 1240 involves determining a third vector of samples representing a data region 46 that corresponds to the ISI-free region 34. As an example, the third vector is determined according to the equation $\vec{r}_{1b}=[r(\hat{\theta}+L-1) \ldots r(\hat{\theta}+N+N_{cp}-1)]$.

Step 1250 involves determining a fourth vector of samples representing a data region 44 that corresponds to the ISI region 32. As an example, the fourth vector is determined according to the equation $\vec{r}_{2b}=[r(\hat{\theta}+N) \ldots r(\hat{\theta}+N+L-2)]$.

Step 1260 involves determining a CFO using the first vector of samples and the third vector of samples. As an example, the CFO is determined using Eq. 6 from above.

Step 1270 involves determining a first cost function using the first vector of samples and the third vector of samples. As an example, the first cost function is determined according to the equation $$J_1(\hat{\theta},\hat{\epsilon}_{\hat{\theta}}) = \left\| e^{j2\pi\hat{\epsilon}} \vec{r}_{1a} - \vec{r}_{1b} \right\|_2^2.$$

Step 1280 involves determining a second cost function using the second vector of samples and the fourth vector of samples. As an example, the second cost function is determined according to the equation $$J_2(\hat{\theta},\hat{\epsilon}_{\hat{\theta}}) = \left\| e^{j2\pi\hat{\epsilon}} \vec{r}_{2a} - \vec{r}_{2b} \right\|_2^2.$$

Step 1290 involves, for $1<L<N_{cp}$, where L is the order of a multi-path channel of the ODFM signal, determining a set I of round (PN) STOs yielding the smallest values of the second cost function, where $0<P \leq 1$.

Step 1300 involves determining an estimated STO and an estimated CFO using the set of round (PN) STOs and using the first cost function. As an example, the estimated STO and the estimated CFO are determined according to the equation if $1<L<N_{cp}$, $(\hat{\theta}^*,\hat{\epsilon}^*)=\min_{(\hat{\theta},\hat{\epsilon})\in I}J_1(\hat{\theta},\hat{\epsilon}_{\hat{\theta}})$, where if $L=1$, $(\hat{\theta}^*,\hat{\epsilon}^*)=\min_{(\hat{\theta},\hat{\epsilon})}J_1(\hat{\theta},\hat{\epsilon}_{\hat{\theta}})$ and if $L=N_{cp}$, $(\hat{\theta}^*,\hat{\epsilon}^*)=\min_{(\hat{\theta},\hat{\epsilon})}J_2(\hat{\theta},\hat{\epsilon}_{\hat{\theta}})$. In some embodiments, P and L are inversely proportional, wherein P is determined using predetermined regression coefficients.

Method 1200 may be implemented as a series of modules, either functioning alone or in concert, with physical electronic and computer hardware devices. Method 1200 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Non-Data-Aided Joint Time and Frequency Offset Estimate Method for OFDM Systems Using Channel Order Based Regression are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A method comprising the steps of:
   receiving a plurality of samples of at least one orthogonal frequency division multiplex (OFDM) signal, the samples containing at least one complete OFDM symbol including data samples and a cyclic prefix comprising inter-symbol interference (ISI) samples and ISI-free samples; and
   using the ISI samples to limit the search region of possible symbol time offset (STO) estimates made using the ISI-free samples.

2. The method of claim 1, wherein the using step comprises the steps of:
   determining a first cost function using the ISI-free samples and using data samples that correspond to the ISI-free samples;
   determining a second cost function using the ISI samples and using data samples that correspond to the ISI samples;
   using regression coefficients to determine a set I of symbol time offsets (STOs) yielding the smallest second cost function, where the cardinality of I is equal to round (PN), where N is the number of sub-carriers of the OFDM signal and $0 < P \leq 1$; and
   determining a joint estimate of STO and carrier frequency offset (CFO) by finding values of the STO and the CFO within I that result in the minimization of the first cost function.

3. The method of claim 2, wherein the first cost function is determined according to the equation $$J_1(\hat{\theta}, \hat{\varepsilon}_{\hat{\theta}}) = \left\| e^{j2\pi\hat{\varepsilon}} \vec{r}_{1a} - \vec{r}_{1b} \right\|_2^2$$

and the second cost function is determined according to the equation $$J_2(\hat{\theta}, \hat{\varepsilon}_{\hat{\theta}}) = \left\| e^{j2\pi\hat{\varepsilon}} \vec{r}_{2a} - \vec{r}_{2b} \right\|_2^2,$$

where $\vec{r}_{1a}$ is a first vector representing the ISI-free samples of the cyclic prefix, $\vec{r}_{2a}$ is a second vector representing the ISI samples of the cyclic prefix, $\vec{r}_{1b}$ is a third vector representing the data samples that correspond to the ISI-free samples, and $\vec{r}_{2b}$ is a fourth vector representing the data samples that correspond to the ISI samples.

4. The method of claim 3, wherein the first vector is determined according to the equation $\vec{r}_{1a} = [r(\hat{\theta}+L-1) \ldots r(\hat{\theta}+N_{cp}-1)]$, where r is the received samples, $\hat{\theta}$ is an estimate of the STO, L is an order of the channel experienced by the ODFM signal, and $N_{cp}$ is the length of a cyclic prefix of the OFDM symbol.

5. The method of claim 3, wherein the second vector is determined according to the equation $\vec{r}_{2a} = [r(\hat{\theta}) \ldots r(\hat{\theta}+L-2)]$, where r is the received samples, $\hat{\theta}$ is an estimate of the STO, and L is an order of the channel experienced by the ODFM signal.

6. The method of claim 3, wherein the third vector is determined according to the equation $\vec{r}_{1b} = [r(\hat{\theta}+N+L-1) \ldots r(\hat{\theta}+N+N_{cp}-1)]$, where r is the received OFDM samples, $\hat{\theta}$ is an estimate of the STO, L is an order of the channel experienced by the ODFM signal, and $N_{cp}$ is the length of a cyclic prefix of the OFDM symbol.

7. The method of claim 3, wherein the fourth vector is determined according to the equation $\vec{r}_{2b} = [r(\hat{\theta}+N) \ldots r(\hat{\theta}+N+L-2)]$, where r is the received OFDM samples, $\hat{\theta}$ is an estimate of the STO, and L is an order of the channel experienced by the ODFM signal.

8. The method of claim 3, wherein the CFO is determined according to the equation $$\hat{\varepsilon}_{\hat{\theta}} = -\frac{1}{2\pi} \angle \left( \vec{r}_{1a} \vec{r}_{1b}^H \right),$$

wherein is a conjugate transpose operator, where $$\hat{\varepsilon} = -\frac{1}{2\pi} \angle \sum_{m=L-1}^{N_{cp}-1} \left( r(m+\hat{\theta}) r^*(N+m+\hat{\theta}) \right),$$

where $\hat{\theta}$ is an estimate of the STO, m is an indexing variable, r* is a complex conjugate of r, L is an order of the channel experienced by the ODFM signal, and $N_{cp}$ is the length of a cyclic prefix of the OFDM symbol.

9. A method comprising the steps of:
   receiving a plurality of samples of at least one transmitted orthogonal frequency division multiplex (OFDM) signal, the samples containing at least one complete OFDM symbol, the samples having a minimum length $2N+N_{cp}$, where N is the number of sub-carriers of the OFDM signal and $N_{cp}$ is the length of a cyclic prefix of the OFDM symbol;
   determining a first vector of samples representing an inter-symbol interference (ISI)-free region of the cyclic prefix;
   determining a second vector of samples representing an ISI region of the cyclic prefix;
   determining a third vector of samples representing a data region that corresponds to the ISI-free region;
   determining a fourth vector of samples representing a data region that corresponds to the ISI region;
   determining a carrier frequency offset using the first vector of samples and the second vector of samples;
   determining a first cost function using the first vector of samples and the third vector of samples;
   determining a second cost function using the second vector of samples and the fourth vector of samples; and
   for $1 < L < N_{cp}$, where L is an order of the channel experienced by the ODFM signal, determining a set I of symbol time offsets (STOs) yielding the smallest values of the second cost function, where the cardinality of I is equal to round (PN), where $0 < P \leq 1$, and determining an estimated STO and an estimated carrier frequency offset (CFO) using the set of I STOs and using the first cost function.

10. The method of claim 9, wherein the first vector is determined according to the equation $\vec{r}_{1a} = [r(\hat{\theta}+L-1) \ldots$ $r(\hat{\theta}+N_{cp}-1)]$, where r is the received samples, $\hat{\theta}$ is an estimate of the STO, L is an order of the channel experienced by the ODFM signal, and $N_{cp}$ is the length of a cyclic prefix of the OFDM symbol.

11. The method of claim 9, wherein the second vector is determined according to the equation $\vec{r}_{2a}=[r(\hat{\theta})\ldots r(\hat{\theta}+L-2)]$, where r is the received samples, $\hat{\theta}$ is an estimate of the STO, and L is an order of the channel experienced by the ODFM signal.

12. The method of claim 9, wherein the third vector is determined according to the equation $\vec{r}_{1b}=[r(\hat{\theta}+N+L-1)\ldots r(\hat{\theta}+N+N_{cp}-1)]$, where r is the received OFDM samples, $\hat{\theta}$ is an estimate of the STO, L is an order of the channel experienced by the ODFM signal, and $N_{cp}$ is the length of a cyclic prefix of the OFDM symbol.

13. The method of claim 9, wherein the fourth vector is determined according to the equation $\vec{r}_{2b}=[r(\hat{\theta}+N)\ldots r(\hat{\theta}+N+L-2)]$, where r is the received OFDM samples, $\hat{\theta}$ is an estimate of the STO, and L is an order of the channel experienced by the ODFM signal.

14. The method of claim 9, wherein the CFO is determined according to the equation $$\hat{\varepsilon}_{\hat{\theta}} = -\frac{1}{2\pi}\angle(\vec{r}_{1a}\vec{r}_{1b}^H),$$

where H is a conjugate transpose operator, where $$\hat{\varepsilon} = -\frac{1}{2\pi}\angle\sum_{m=L-1}^{N_{cp}-1}(r(m+\hat{\theta})r^*(N+m+\hat{\theta})),$$

where $\hat{\theta}$ is an estimate of the STO, m is an indexing variable, r* is a complex conjugate of r, L is an order of the channel experienced by the ODFM signal, and $N_{cp}$ is the length of a cyclic prefix of the OFDM symbol.

15. The method of claim 9, wherein the first cost function is determined according to the equation $$J_1(\hat{\theta}, \hat{\varepsilon}_{\hat{\theta}}) = \|e^{j2\pi\hat{\varepsilon}}\vec{r}_{1a} - \vec{r}_{1b}\|_2^2$$

and the second cost function is determined according to the equation $$J_2(\hat{\theta}, \hat{\varepsilon}_{\hat{\theta}}) = \|e^{j2\pi\hat{\varepsilon}}\vec{r}_{2a} - \vec{r}_{2b}\|_2^2.$$

16. The method of claim 9, wherein the estimated STO and an estimated CFO are determined according to the equation if $1<L<N_{cp}$, $(\hat{\theta}^*,\hat{\varepsilon}^*)=\min_{(\hat{\theta},\hat{\varepsilon})\in J_1}(\hat{\theta},\hat{\varepsilon}_{\hat{\theta}})$, where $(\hat{\theta}^*,\hat{\varepsilon}^*)$ represents the final STO and CFO estimates, where $$\hat{\varepsilon}_{\hat{\theta}} = -\frac{1}{2\pi}\angle(\vec{r}_{1a}\vec{r}_{1b}^H),$$

where H is the conjugate transpose operator, where $$\hat{\varepsilon} = -\frac{1}{2\pi}\angle\sum_{m=L-1}^{N_{cp}-1}(r(m+\hat{\theta})r^*(N+m+\hat{\theta})),$$

where $\hat{\theta}$ is an estimate of the STO, m is an indexing variable, r* is the complex conjugate of r, L is the order of the channel experienced by the ODFM signal, and $$J_1(\hat{\theta}, \hat{\varepsilon}_{\hat{\theta}}) = \|e^{j2\pi\hat{\varepsilon}}\vec{r}_{1a} - \vec{r}_{1b}\|_2^2.$$

17. The method of claim 9, wherein if L=1, $(\hat{\theta}^*,\hat{\varepsilon}^*)=\min_{(\hat{\theta},\hat{\varepsilon})}J_1(\hat{\theta},\hat{\varepsilon}_{\hat{\theta}})$, where $(\hat{\theta}^*,\hat{\varepsilon}^*)$ represents the final STO and CFO estimates, where $$\hat{\varepsilon}_{\hat{\theta}} = -\frac{1}{2\pi}\angle(\vec{r}_{1a}\vec{r}_{1b}^H),$$

H is the conjugate transpose operator, $$\hat{\varepsilon} = -\frac{1}{2\pi}\angle\sum_{m=L-1}^{N_{cp}-1}(r(m+\hat{\theta})r^*(N+m+\hat{\theta})),$$

$\hat{\theta}$ is an estimate of the STO, m is an indexing variable, r* is the complex conjugate of r, L is the order of the channel experienced by the ODFM signal, and $$J_1(\hat{\theta}, \hat{\varepsilon}_{\hat{\theta}}) = \|e^{j2\pi\hat{\varepsilon}}\vec{r}_{1a} - \vec{r}_{1b}\|_2^2.$$

18. The method of claim 9, wherein if $L=N_{cp}$, $(\hat{\theta}^*,\hat{\varepsilon}^*)=\min_{(\hat{\theta},\hat{\varepsilon})}J_2(\hat{\theta},\hat{\varepsilon}_{\hat{\theta}})$, where $(\hat{\theta}^*,\hat{\varepsilon}^*)$ represents the final STO and CFO estimates, $$\hat{\varepsilon}_{\hat{\theta}} = -\frac{1}{2\pi}\angle(\vec{r}_{1a}\vec{r}_{1b}^H),$$

where H is the conjugate transpose operator, $$\hat{\varepsilon} = -\frac{1}{2\pi}\angle\sum_{m=L-1}^{N_{cp}-1}(r(m+\hat{\theta})r^*(N+m+\hat{\theta})),$$

$\hat{\theta}$ is an estimate of the STO, m is an indexing variable, r* is the complex conjugate of r, L is the order of the channel experienced by the ODFM signal, and $$J_2(\hat{\theta}, \hat{\varepsilon}_{\hat{\theta}}) = \|e^{j2\pi\hat{\varepsilon}}\vec{r}_{2a} - \vec{r}_{2b}\|_2^2.$$

19. The method of claim 9, wherein P and L are inversely proportional, wherein P is determined using predetermined regression coefficients.

20. A system comprising:
a receiver; and
a processor contained within the receiver, the processor configured to receive a plurality of samples of at least one orthogonal frequency division multiplex (OFDM) signal, the samples containing at least one complete OFDM symbol including a cyclic prefix comprising inter-symbol interference (ISI) samples and ISI-free samples, and further configured to use the ISI samples to limit the search region of possible symbol time offset (STO) estimates made using the ISI-free samples.

* * * * *